US011563537B2

(12) United States Patent
John Wilson et al.

(10) Patent No.: US 11,563,537 B2
(45) Date of Patent: Jan. 24, 2023

(54) EXCHANGING QUASI COLOCATION INFORMATION BETWEEN A USER EQUIPMENT AND A BASE STATION THAT INDICATES AN ASSOCIATION BETWEEN A SPATIAL PARAMETER AND A CURRENT TRANSMISSION CONFIGURATION

(71) Applicant: QUALCOMM Incorporated, San Diego, CA (US)

(72) Inventors: Makesh Pravin John Wilson, San Diego, CA (US); Tao Luo, San Diego, CA (US); Yan Zhou, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 16/653,673

(22) Filed: Oct. 15, 2019

(65) Prior Publication Data
US 2020/0119875 A1 Apr. 16, 2020

Related U.S. Application Data

(60) Provisional application No. 62/746,541, filed on Oct. 16, 2018.

(51) Int. Cl.
*H04N 1/32* (2006.01)
*H04L 5/00* (2006.01)
(Continued)

(52) U.S. Cl.
CPC ......... *H04L 5/0048* (2013.01); *H04B 1/1027* (2013.01); *H04N 1/32149* (2013.01); *H04W 72/1289* (2013.01); *H04N 21/42676* (2013.01)

(58) Field of Classification Search
CPC ......... H04W 72/1268; H04W 72/1284; H04W 72/1289; H04W 52/14; H04B 7/0626;
(Continued)

(56) References Cited

U.S. PATENT DOCUMENTS 9,379,876 B2 6/2016 Suzuki et al.
9,614,653 B2 4/2017 Kim et al.
(Continued)

FOREIGN PATENT DOCUMENTS

WO 2018172994 A1 9/2018

OTHER PUBLICATIONS

R1-1716842, "WF on QCL Indication for DL Physical Channels" Sep. 18-21, 2017, pp. 1-9 (Year: 2017).*
(Continued)

*Primary Examiner* — Salvador E Rivas
(74) *Attorney, Agent, or Firm* — Muncy, Geissler, Olds & Lowe, P.C.

(57) ABSTRACT

In an embodiment, a UE determines QCL information that indicates an association between a spatial parameter and a current transmission configuration, and conveys the determined QCL information to a BS. In another embodiment, a BS transmits a DCI that triggers transmission of a reference signal that includes QCL information that indicates an association between a spatial parameter and a current transmission configuration, whereby any DCI triggering any reference signal that includes any QCL information is configured to trigger a UE to send an express acknowledgment or an implied acknowledgment to that DCI.

44 Claims, 12 Drawing Sheets

(51) Int. Cl.
*H04W 72/12* (2009.01)
*H04B 1/10* (2006.01)
*H04N 21/426* (2011.01)

(58) Field of Classification Search
CPC .............. H04B 1/1027; H04L 27/2646; H04L 29/06523; H04N 21/4382; H04N 1/32149; H04N 21/42676
See application file for complete search history.

(56) References Cited

U.S. PATENT DOCUMENTS

| | | | |
|---|---|---|---|
| 10,085,202 | B2 | 9/2018 | Ng et al. |
| 10,098,109 | B2 | 10/2018 | Chen et al. |
| 2018/0352533 | A1 | 12/2018 | Islam et al. |
| 2019/0260532 | A1* | 8/2019 | Manolakos ........... H04L 5/0094 |
| 2020/0059951 | A1* | 2/2020 | Frenne .............. H04W 72/1289 |
| 2020/0213058 | A1* | 7/2020 | Choi ..................... H04L 5/0053 |
| 2020/0396765 | A1* | 12/2020 | Liang ................... H04L 1/0027 |
| 2021/0307076 | A1* | 9/2021 | Matsumura ....... H04W 74/0833 |

OTHER PUBLICATIONS

Fujitsu: "Discussion on beam indication", 3GPP Draft, R1-1717716 Discussion on Beam Indication Final, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340901, 4 Pages, Retrieved from the Internet: URL:http://www.3gpp.org/ftp/Meetings_3GPP_SYNC/RAN1/Docs/ [retrieved on Oct. 8, 2017].

International Search Report and Written Opinion—PCT/US2019/056507—ISA/EPO—dated Dec. 16, 2019.

Samsung: "Discussion on Beam Indication for UL Transmission," 3GPP Draft; R1-1717620, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340806, 6 pages, Retrieved from the Internet: URL: http://www.3gpp.org/ftp/Meetings_3GPP_SYNC/RAN1/Docs/ [retrieved on Oct. 8, 2017], Section 2, 3.1, 3.2 and 3.3.

Samsung: "On Beam Indication", 3GPP Draft, 3GPP TSG RAN WG1 Meeting 90bis, R1-1717627 On Beam Indication_V1, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051340813, 9 Pages, Retrieved from the Internet: URL:http://www.3gpp.org/ftp/Meetings_3GPP_SYNC/RAN1/Docs/ [retrieved on Oct. 8, 2017].

* cited by examiner

EXCHANGING QUASI COLOCATION INFORMATION BETWEEN A USER EQUIPMENT AND A BASE STATION THAT INDICATES AN ASSOCIATION BETWEEN A SPATIAL PARAMETER AND A CURRENT TRANSMISSION CONFIGURATION

CROSS-REFERENCE TO RELATED APPLICATIONS

The present Application for Patent claims the benefit of Provisional Patent Application No. 62/746,541 entitled "EXCHANGING QUASI COLOCATION INFORMATION AND ACKNOWLEDGING DOWNLINK CONTROL INFORMATION" filed Oct. 16, 2018, and assigned to the assignee hereof and hereby expressly incorporated herein by reference in its entirety.

TECHNICAL FIELD

Various aspects described herein generally relate to wireless communication systems, and more particularly, to exchanging quasi colocation information and acknowledging downlink control information.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

SUMMARY

An embodiment is directed to a method of operating a user equipment (UE), comprising determining Quasi Co-Location (QCL) information, wherein the QCL information indicates an association between a spatial parameter and a current transmission configuration, and transmitting, to a base station (BS), the determined QCL information.

Another embodiment is directed to a method of operating a base station (BS), comprising receiving, from a user equipment (UE), Quasi Co-Location (QCL) information as determined at the UE, wherein the QCL information indicates an association between a spatial parameter and a current transmission configuration.

Another embodiment is directed to a method of operating a base station (BS), comprising transmitting, to a user equipment (UE) on one or more downlink channels, one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a method of operating a user equipment (UE), comprising monitoring one or more downlink channels for one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a user equipment (UE), comprising means for determining Quasi Co-Location (QCL) information, wherein the QCL information indicates an association between a spatial parameter and a current transmission configuration, and means for transmitting, to a base station (BS), the determined QCL information.

Another embodiment is directed to a base station (BS), comprising a memory, at least one processor, and means for receiving, from a user equipment (UE), Quasi Co-Location (QCL) information as determined at the UE, wherein the QCL information indicates an association between a spatial parameter and a current transmission configuration.

Another embodiment is directed to a base station (BS), comprising a memory, at least one processor, and means for transmitting, to a user equipment (UE) on one or more downlink channels, one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a user equipment (UE), comprising a memory, at least one processor, and means for monitoring one or more downlink channels for one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a user equipment (UE), comprising a memory, and at least one processor coupled to the memory and configured to determine Quasi Co-Location (QCL) information, wherein the QCL information indicates an association between a spatial parameter and a current transmission configuration, and transmit, to a base station (BS), the determined QCL information.

Another embodiment is directed to a base station (BS), comprising a memory, and at least one processor coupled to the memory and configured to receive, from a user equipment (UE), Quasi Co-Location (QCL) information as determined at the UE, wherein the QCL information indicates an association between a spatial parameter and a current transmission configuration.

Another embodiment is directed to a base station (BS), comprising a memory, and at least one processor coupled to the memory and configured to transmit, to a user equipment (UE) on one or more downlink channels, one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a user equipment (UE), comprising a memory, and at least one processor coupled to the memory and configured to monitor one or more downlink channels for one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a non-transitory computer-readable medium containing instructions stored thereon, which, when executed by a user equipment (UE), cause the UE to perform operations, the instructions comprising at least one instruction to cause the UE to determine Quasi Co-Location (QCL) information, wherein the QCL information indicates an association between a spatial parameter and a current transmission configuration, and at least one instruction to cause the UE to transmit, to a base station (BS), the determined QCL information.

Another embodiment is directed to a non-transitory computer-readable medium containing instructions stored thereon, which, when executed by a base station (BS), cause the BS to perform operations, the instructions comprising at least one instruction to cause the BS to receive, from a user equipment (UE), Quasi Co-Location (QCL) information as determined at the UE, wherein the QCL information indicates an association between a spatial parameter and a current transmission configuration.

Another embodiment is directed to a non-transitory computer-readable medium containing instructions stored thereon, which, when executed by a base station (BS), cause the BS to perform operations, the instructions comprising at least one instruction to cause the BS to transmit, to a user equipment (UE) on one or more downlink channels, one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

Another embodiment is directed to a non-transitory computer-readable medium containing instructions stored thereon, which, when executed by a user equipment (UE), cause the UE to perform operations, the instructions comprising at least one instruction to cause the UE to monitor one or more downlink channels for one or more Downlink Control Informations (DCIs) that trigger transmission of a reference signal that includes Quasi Co-Location (QCL) information that indicates an association between a spatial parameter and a current transmission configuration, wherein any DCI triggering any reference signal that includes any QCL information is configured to trigger the UE to send an express acknowledgment or an implied acknowledgment to that DCI.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
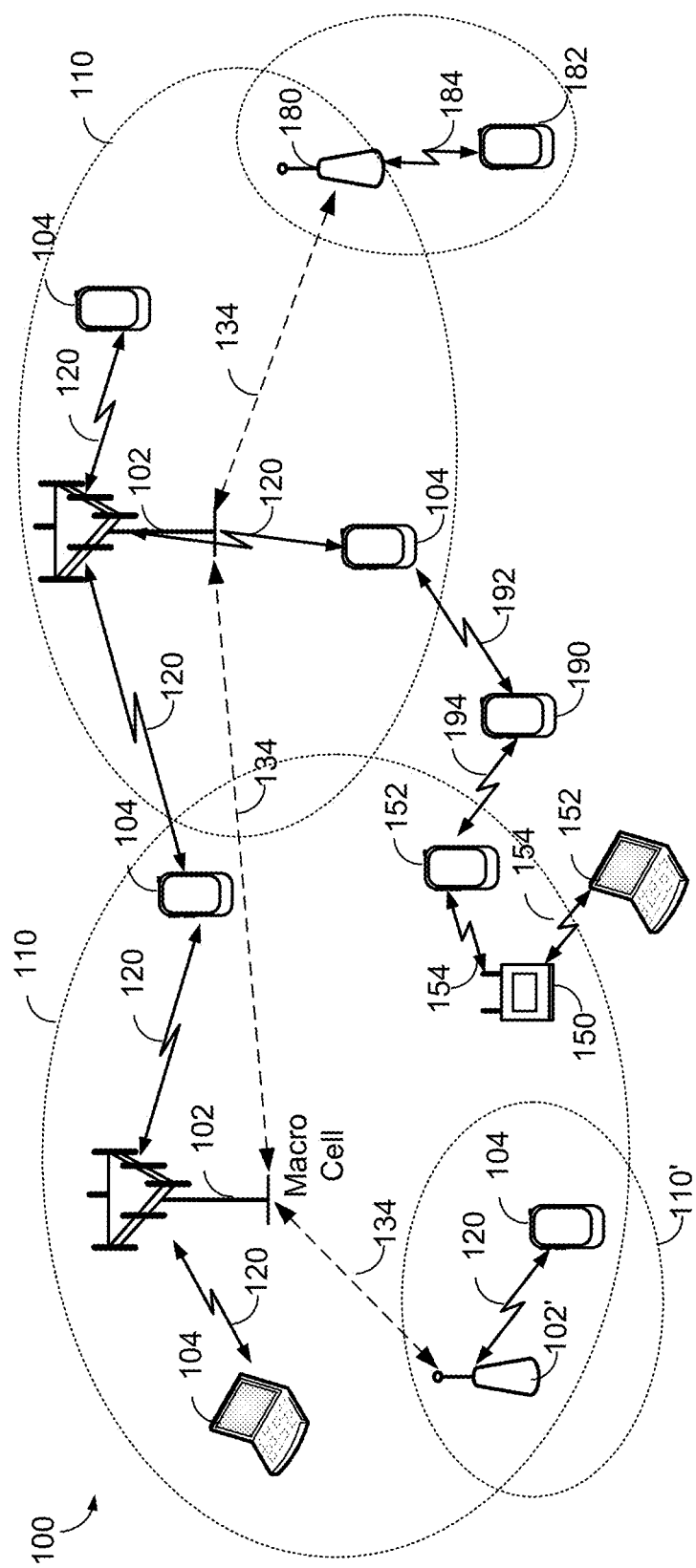
FIG. 1 illustrates an exemplary wireless communications system, according to various aspects.

Various aspects described herein generally relate to resolving Quasi Co-Location (QCL) information mismatches between a user equipment (UE) and a base station. In one aspect, the UE determines QCL information and then transmits the determined QCL information to a base station.

In another aspect, any Channel State Information (CSI) Reference Signal (RS) transmitted by the base station to the UE is configured to the UE to send an express acknowledgment or an implied acknowledgment to that CSI-RS.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

An important aspect for beam management is Quasi Colocation (QCL) information. Generally, antenna ports are considered quasi co-located when they are in-fact co-located (i.e., transmitted from the same transmission point, antenna array, or antenna) or when the antenna ports are arranged in different transmission points with similar channel properties. QCL information refers to knowledge of a QCL-association between particular reference signals (e.g., channel-specific reference signals, reference signals that are generic to channel type, uplink reference signals, downlink reference signals, etc.). For example, the QCL information for a particular UL/DL channel or signal may indicate an association between a spatial parameter (e.g., a spatial domain receive filter for downlink communications or a spatial domain transmit filter for uplink communications) and a current transmission configuration (e.g., one or more Transmission Configuration Information (TCI) state assumptions, a reference to the most recent message associated with the QCL information that was successfully received at the UE, etc.), such as a reference-spatial QCL-association, a delay spread QCL association, an average delay QCL association, a doppler spread QCL association, a doppler shift QCL association, or a combination thereof.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
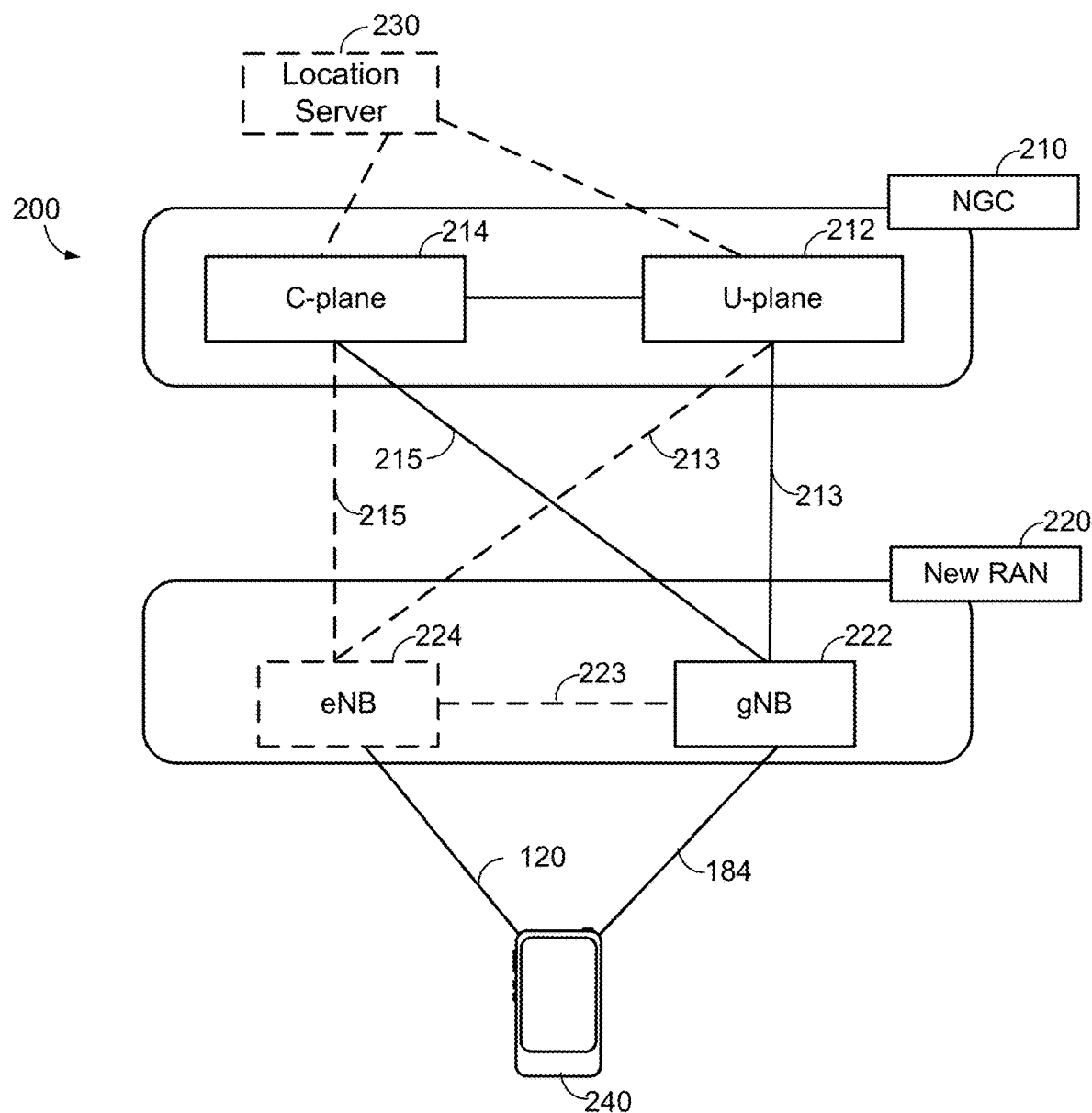
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.) via communication links 184 or 120, respectively. Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
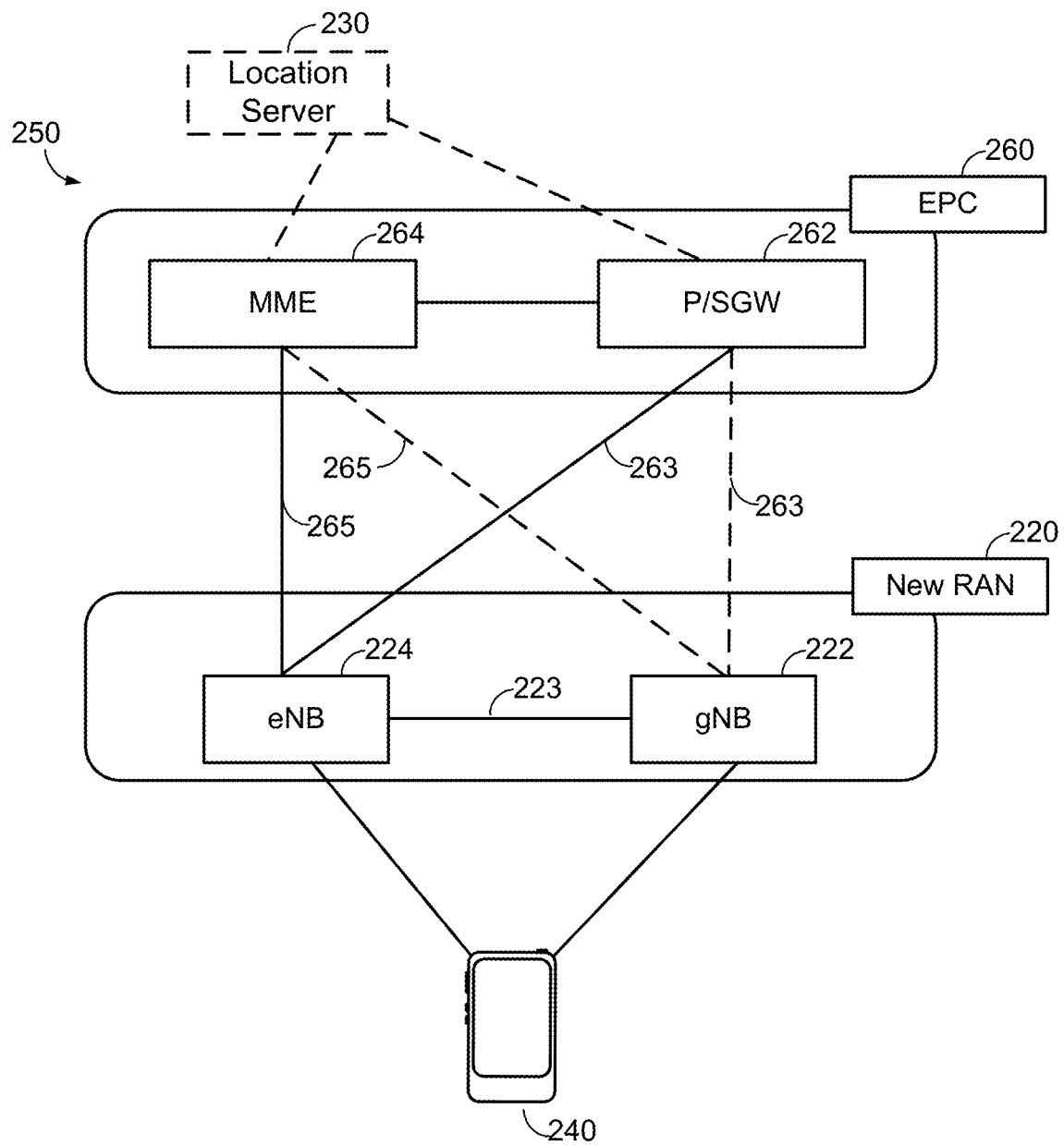

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3A:
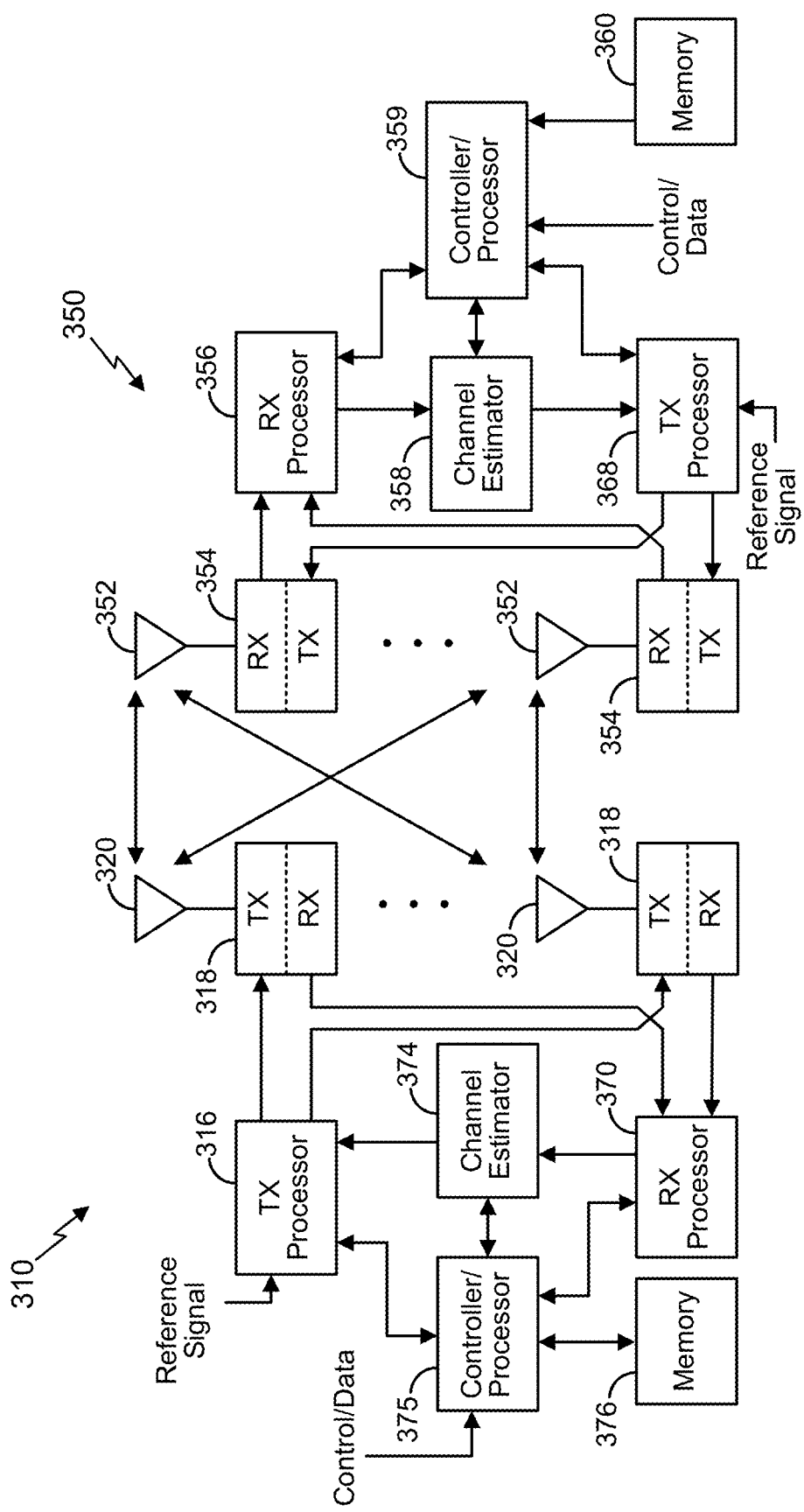
FIG. 3A illustrates an exemplary base station and an exemplary user equipment (UE) in an access network, according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 3B:
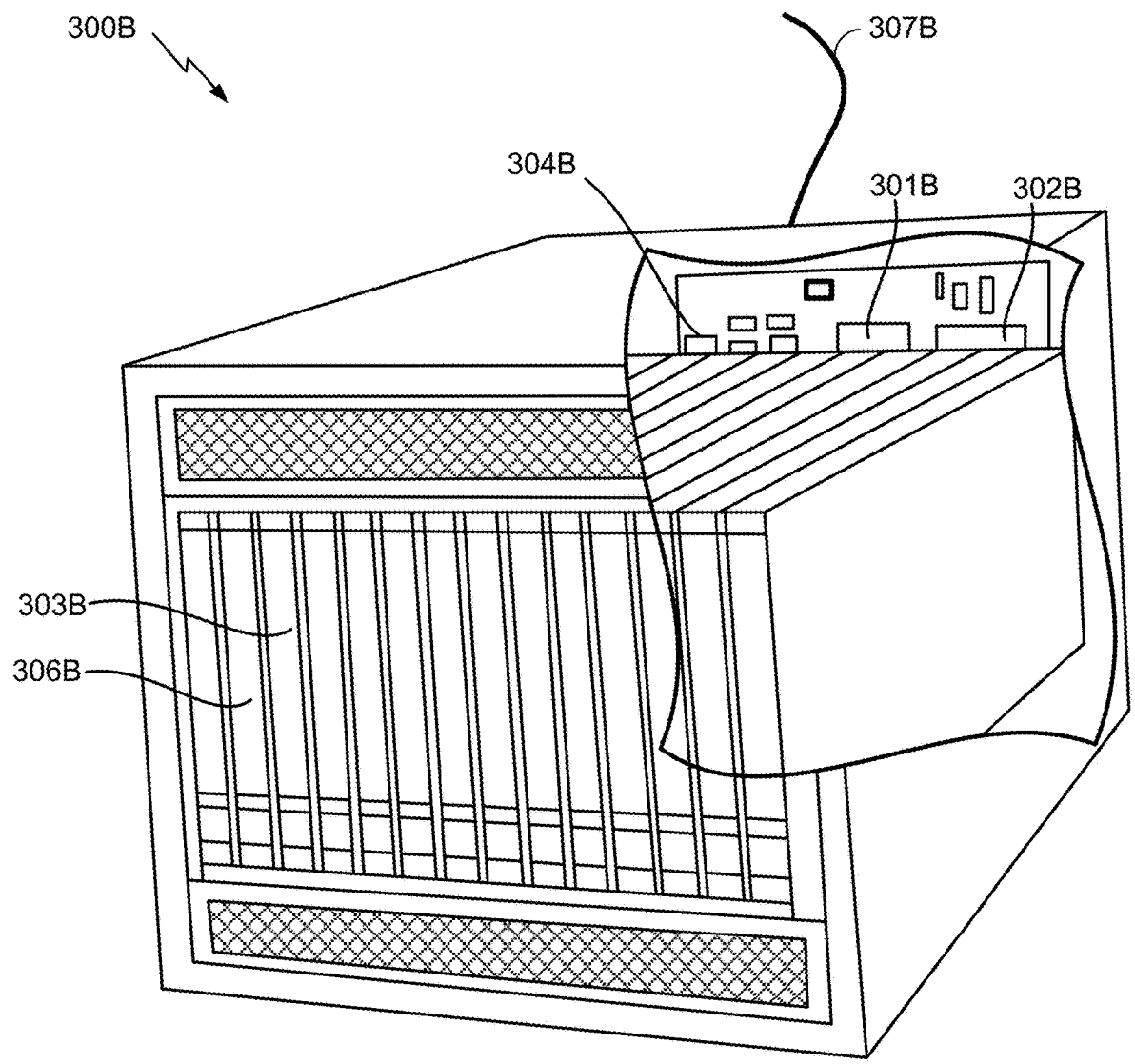
FIG. 3B illustrates an exemplary server.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4A:
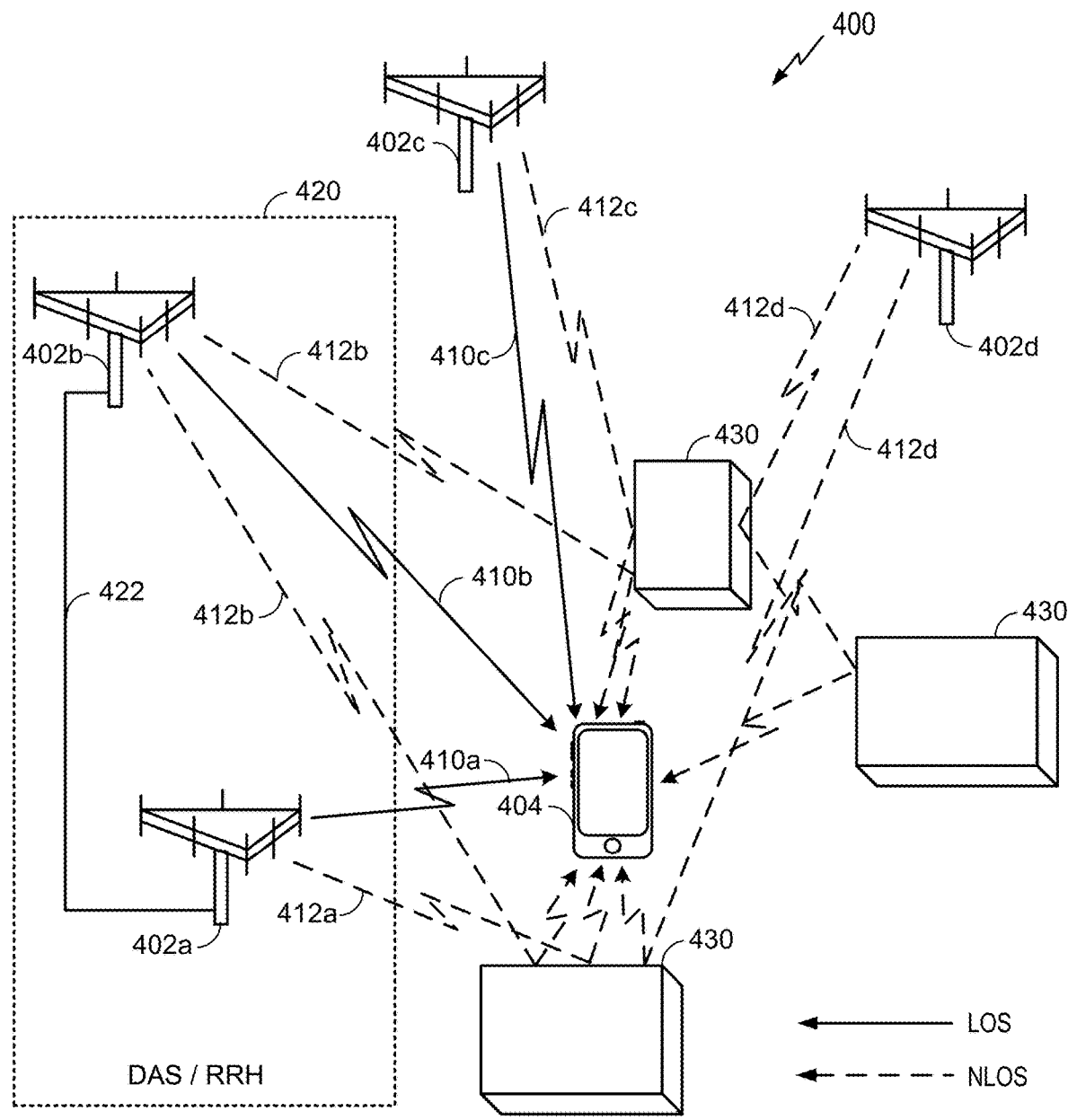
FIG. 4A illustrates an exemplary wireless communications system according to various aspects of the disclosure.

FIG. 4A illustrates an exemplary wireless communications system 400 according to various aspects of the disclosure. In the example of FIG. 4A, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4A illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., Observed Time Difference Of Arrival (OTDOA) or Reference Signal Time Difference Measurement (RSTD)) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna (s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4A illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4A illustrates a number of LOS paths 410 and a number of NLOS paths 412 between the base stations 402 and the UE 404. Specifically, FIG. 4A illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4A, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beam.

While FIG. 4A is described in terms of transmissions from a base station to a UE, it will be appreciated that the downlink RF signal paths described with respect to FIG. 4A are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

In 5G, an important aspect for beam management is Quasi Colocation (QCL) information. Generally, antenna ports are considered quasi co-located when they are in-fact co-located (i.e., transmitted from the same transmission point, antenna array, or antenna) or when the antenna ports are arranged in different transmission points with similar channel properties. QCL information refers to knowledge of a QCL-association between a spatial parameter (e.g., a spatial domain receive filter for downlink communications or a spatial domain transmit filter for uplink communications) and a current transmission configuration (e.g., one or more Transmission Configuration Information (TCI) state assumptions, a reference to the most recent message associated with the QCL information that was successfully received at the UE, etc.). In some designs, the QCL information may be associated with particular reference signals (e.g., channel-specific reference signals, reference signals that are generic to channel type, uplink reference signals, downlink reference signals, etc.). In one example, the QCL-association can represent a relation between reference signals that are generic to channel type (such as CSI-RS, synchronization signal block (SSB), TRS, etc.) and channel reference signals such as a PDCCH de-modulation reference signal (DMRS), PDSCH DMRS, PUCCH DMRS, PUSCH DMRS, etc. For example, the QCL information for particular reference signals may indicate a reference-spatial QCL-association, a delay spread QCL association, an average delay QCL association, a doppler spread QCL association, a doppler shift QCL association, or a combination thereof.

In certain protocols such as 5G, there are four types of QCL:

TABLE 1

QCL Type Examples

| QCL Type | Description |
| --- | --- |
| QCL-TypeA | Doppler shift, Doppler spread, average delay, delay spread |
| QCL-TypeB | Doppler shift, Doppler spread' |
| QCL-TypeC | Average delay, Doppler shift |
| QCL-TypeD | Spatial Rx parameter |

A particular QCL type may be applied with respect to one or more channel-specific reference signals and/or one or more reference signals generic to channel type on either an uplink or downlink channel. The QCL type and other related QCL information (e.g., cell, bwp-ID, NZP-CSI-RS Resource ID, SSB Index, etc.) is indicated by the Transmission Configuration Indication (TCI) state, which may be conveyed from a serving base station to one or more UEs to facilitate communication therebetween (e.g., PDSCH, PDCCH, etc.).

Figure 4B:
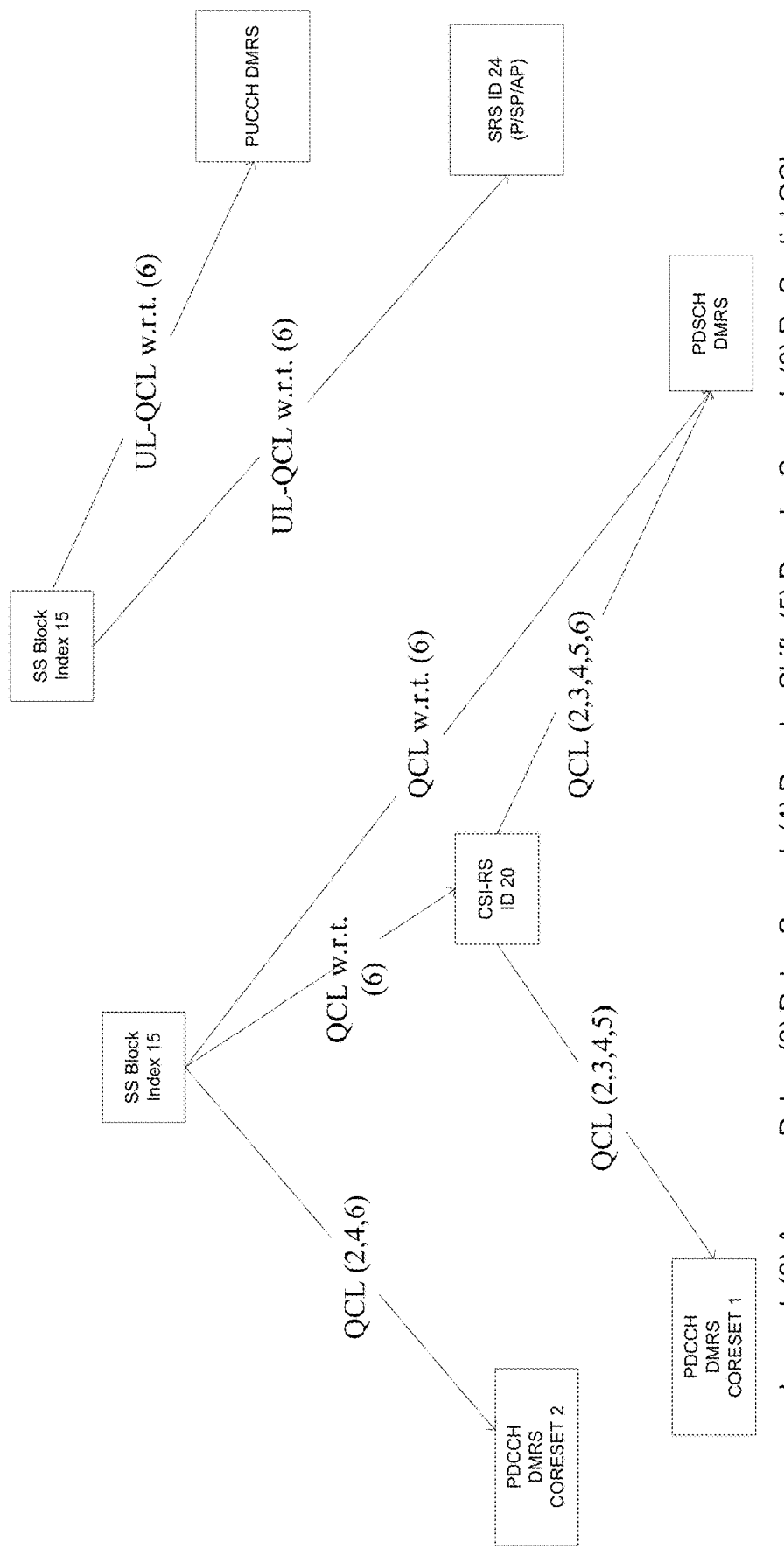
FIG. 4B illustrates an example of reference signal associations that can be conveyed by QCL information in accordance with an embodiment of the disclosure.
Figure 4C:
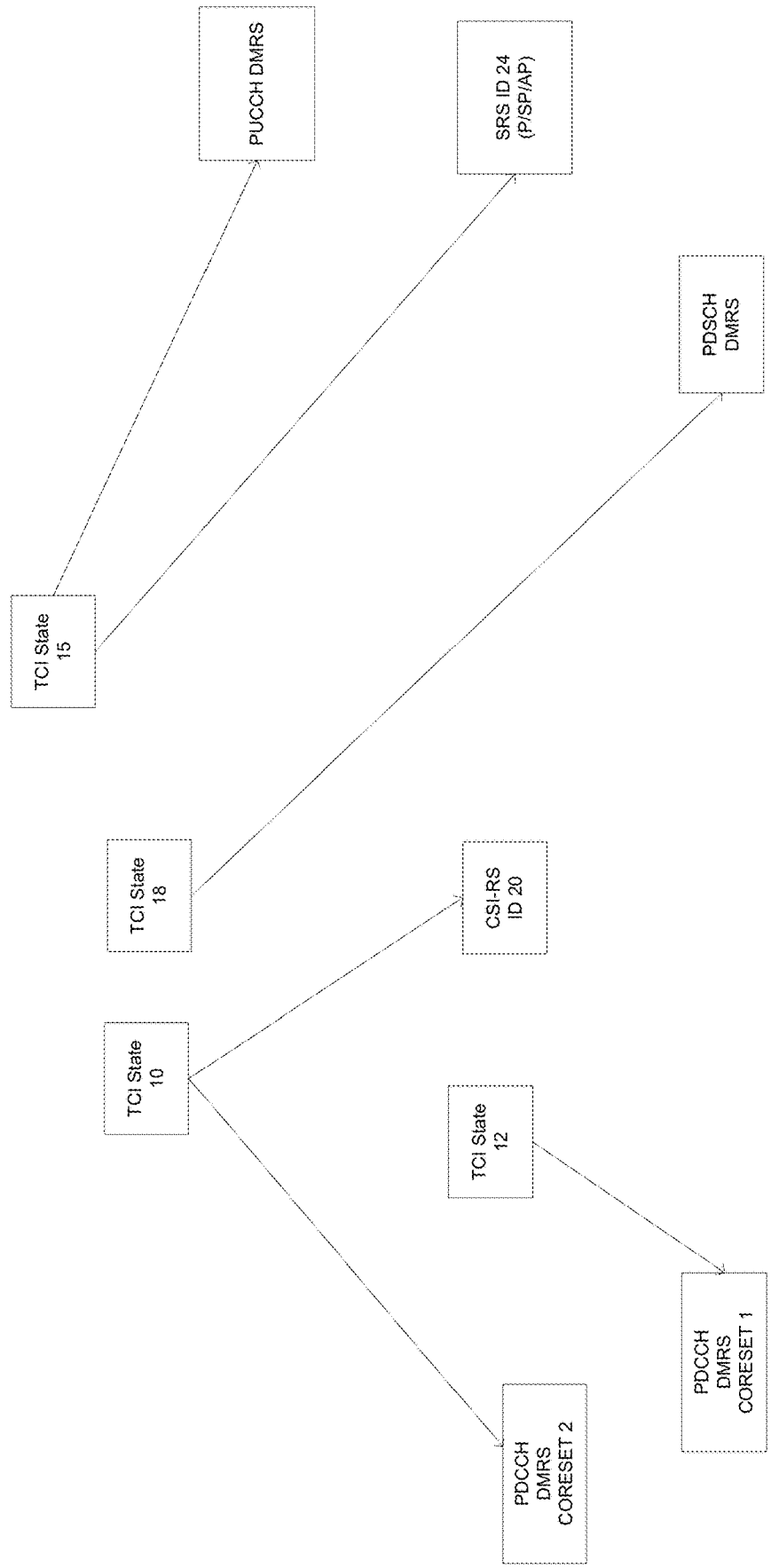
FIG. 4C illustrates an example of TCI states that are associated with particular reference signals in accordance with an embodiment of the disclosure.

FIG. 4B illustrates an example of reference signal associations that can be conveyed by QCL information in accordance with an embodiment of the disclosure. FIG. 4C illustrates an example of TCI states that are associated with particular reference signals in accordance with an embodiment of the disclosure. The TCI states contain RS set and QCL parameters, and hence represent an alternative manner in which the QCL information which indicates reference signal associations can be conveyed. As shown in FIGS. 4B-4C, the reference signal associations conveyed by the QCL information may include any of the following pairings:

SSB and PDCH DMRS, or

SSB and PDSCH DMRS, or

SSB and CSI-RS, or

CSI-RS and PDCCH DMRS, or

SSB and PUCCH DMRS, or

SSB and Sounding Reference Signal (SRS).

In 5G, an aperiodic CSI-RS ("AP-CSI-RS") is one example of a reference signal that is generic to channel type, and is currently being considered as a QCL source (e.g., for UL/DL control and data). In certain implementations, the AP-CSI-RS is triggered via Downlink Control Information (DCI). An example configuration of an AP-CSI-RS trigger list table is shown in Table 2, as follows:

TABLE 2

AP-CSI-RS Trigger List Table

| CSI-AperiodicTriggerStateList | Resource Set | Resources per Resource Set | NZP-CSI-RS-ResourceId | Qcl-Info (TCI State Id) |
| --- | --- | --- | --- | --- |
| CSI-AperiodicTriggerState 1 | 1 | 2 | {30, 31} | {40, 41} |
| CSI-AperiodicTriggerState 2 | 2 | 1 | {32} | {42} |

TABLE 2-continued

AP-CSI-RS Trigger List Table

| CSI-AperiodicTriggerStateList | Resource Set | Resources per Resource Set | NZP-CSI-RS-ResourceId | Qcl-Info (TCI State Id) |
|---|---|---|---|---|
| CSI-AperiodicTriggerState 3 | 4 | 2 | {34, 35} | {44, 45} |
| CSI-AperiodicTriggerState 4 | 1 | 2 | {30, 31} | {50, 51} |
| CSI-AperiodicTriggerState 5 | 1 | 2 | {30, 31} | {55, 56} |
| CSI-AperiodicTriggerState 6 | 3 | 2 | {37, 38} | {60, 61} |
| CSI-AperiodicTriggerState 7 | 2 | 1 | {32} | {44} |

Generally, the AP-CSI-RS trigger state is mapped to a CSI-Resource-set, which is in turn mapped to CSI-Resource (Resource ID), which is in turn mapped to the TCI state. Hence, the AP-CSI-RS trigger state may indirectly update the NZP-CSI-RS Resource IDs of the TCI state (e.g., for CSI-AperiodicTriggerStates 1, 4, 5, etc. in Table 2, above). In an example, a CORESET or a PDSCH can be associated with a TCI state whose QCL information could be a NZP-CSI-RS Resource ID. For example, with respect to CSI-AperiodicTriggerState 4 in Table 2 (above), CORESET 1 Configuration uses TCI State 10 with QCL-Info Type D and NZP-CSI-RS-ResourceID 30, while CORESET 2 Configuration uses TCI State 11 with QCL-Info Type D and NZP-CSI-RS-ResourceID 31. Some DCIs that trigger AP-CSI-RSs (e.g., Tracking RSs (TRSs), etc.) may not result in any type of acknowledgment from the target UE(s). Hence, the UE may retain incorrect or misaligned QCL information with the base station (e.g., due to failure to properly decode the AP-CSI-RS, such as by missing the DCI), while the base station may incorrectly assume that the UE properly decoded the AP-CSI-RS with the up-to-date QCL information (e.g., due to the UE failing to send a ACK/NACK or a report in response to the DCI, an uplink NACK to ACK transfer error, a MAC CE carrying QCL information in PDSCH is implicitly or expressly NACKed by UE but BS misinterprets the NACK as an ACK, etc.). While Table 2 (above) is specific to the AP-CSI-RS, other reference signals that are generic to channel type and are triggered by DCI which may be used to convey QCL information in other embodiments may include CSI-RS, SSB, TRS, etc.

Accordingly, embodiments of the disclosure are directed to reducing or eliminating errors with regard to QCL information assumptions with regard to the QCL information that is believed by a particular UE to be the up-to-date QCL information.

Figure 5:
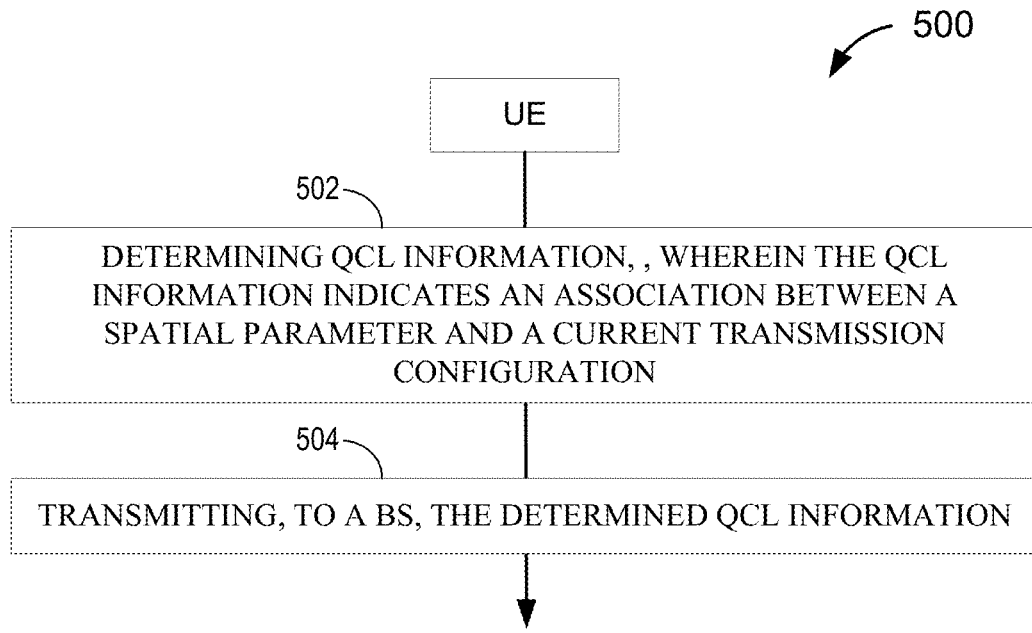
FIG. 5 illustrates an exemplary process of conveying QCL information assumptions from a UE to a base station according to an aspect of the disclosure.

FIG. 5 illustrates an exemplary process 500 of conveying QCL information assumptions from a UE to a base station according to an aspect of the disclosure. The process 500 of FIG. 5 is performed by a UE, which may correspond to any of the above-noted UEs (e.g., UE 240, 350, etc.). At 502, the UE (e.g., controller/processor 375, antenna(s) 352, receiver(s) 354, and/or RX processor 356) determines QCL information, wherein the QCL information indicates an association between a spatial parameter (e.g., a spatial domain receive filter for downlink communications or a spatial domain transmit filter for uplink communications) and a current transmission configuration (e.g., one or more Transmission Configuration Information (TCI) state assumptions, a reference to the most recent message associated with the QCL information that was successfully received at the UE, etc.). At 504, the UE (e.g., antenna(s) 352, transmitter(s) 354, and/or TX processor 368) transmits, to a base station, the determined QCL information from 502.

Figure 6:
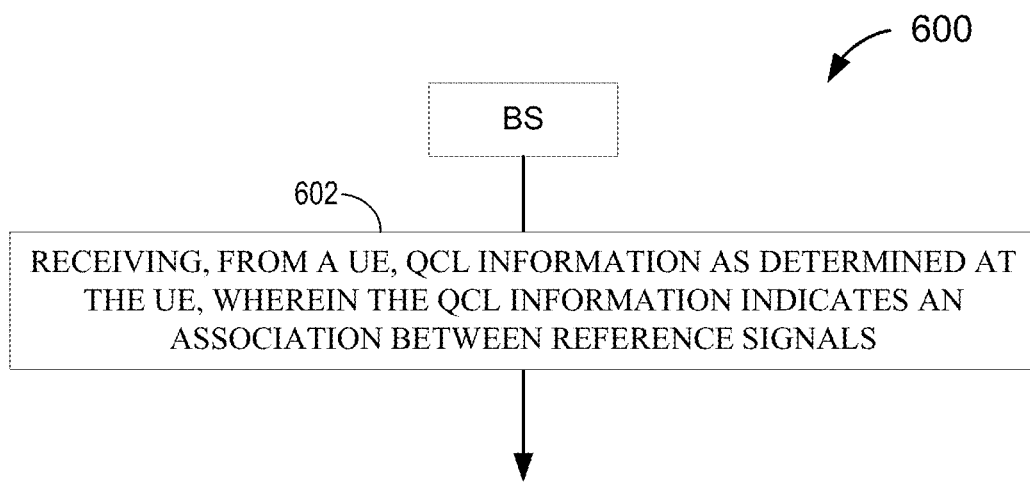
FIG. 6 illustrates an exemplary process of receiving QCL information assumptions from a UE to a base station according to another aspect of the disclosure.

FIG. 6 illustrates an exemplary process 600 of receiving QCL information assumptions at a base station according to another aspect of the disclosure. The process 600 of FIG. 6 is performed by a base station, such as a serving eNB (e.g., eNB 222, 224, 310, etc.). At 602, the base station (e.g., antenna(s) 320, receiver(s) 318, and/or RX processor 370) receives, from a UE, QCL information as determined at the UE, wherein the QCL information indicates an association between a spatial parameter (e.g., a spatial domain receive filter for downlink communications or a spatial domain transmit filter for uplink communications) and a current transmission configuration (e.g., one or more Transmission Configuration Information (TCI) state assumptions, a reference to the most recent message associated with the QCL information that was successfully received at the UE, etc.).

Referring to FIGS. 5-6, in one example, the QCL information may be associated with one or more reference signals, which may include a data channel reference signal (e.g., PDSCH DMRS, PUSCH DMRS, etc.) or a control channel reference signal (e.g., PUCCH DMRS, PDCCH DMRS, etc.). In another example, the reference signals may include a reference signal generic to channel type (e.g., CSI-RS such as AP-CSI-RS, SRS, a Timing Reference Signal (TRS), etc.). In other examples, the reference signals may include a first reference signal corresponding to a data channel reference signal or a control channel reference signal, and a second reference signal that is generic to a channel type.

Referring to FIGS. 5-6, in an example the base station may transmit a DCI that triggers a reference signal (e.g., CSI-RS, SSB, etc.) that includes QCL information to the UE, and the UE may use this reference signal to determine the QCL information at 502. In a further example, the base station may transmit a request for the UE to report the QCL information as determined at the UE (e.g., on a periodic basis, on an event-triggered basis such as following the transmission of a DCI that does not require any type of acknowledgment from the UE), after which 504 and 602 are performed in response to the request. In an example, the request from the base station may designate particular reference signal associations for which QCL information is requested (e.g., RSs only, PDCCH, CORE SET, PDSCH, etc.)

Referring to FIGS. 5-6, in an alternative example, 504 and 602 are performed without an express request from the base station (e.g., on a periodic basis, etc.). In this case, the UE itself may transmit its determined QCL information as an implicit request for the base station to verify its correctness (i.e., that the UE's determined QCL information is up-to-date).

Referring to FIGS. 5-6, in an example, after receiving the QCL information at 602, the base station may determine whether the QCL information received from the UE is up-to-date. The base station may then selectively transmit up-to-date QCL information to the UE based on the determination. In particular, the base station transmits (and the UE receives) updated QCL information if the determined QCL information is not up-to-date, while the base station does not transmit (and the UE thereby does not receive) updated QCL information if the determined QCL information is up-to-date.

Referring to FIGS. 5-6, in an example, reference signal associations indicated by the QCL information may relate to one or more uplink or downlink reference signals, one or more channel-specific reference signals, one or more reference signals generic to channel type, or any combination thereof. Moreover, the QCL information that is exchanged either at 504 of FIG. 5 or 602 of FIG. 6 may be configured in a variety of ways. In one example, the transmission configuration indicated by the QCL information that is exchanged either at 504 of FIG. 5 or 602 of FIG. 6 may include Transmission Configuration Information (TCI) state assumptions. In another example, the transmission configuration indicated by the QCL information that is exchanged either at 504 of FIG. 5 or 602 of FIG. 6 may include a reference to the most recent message associated with the QCL information (e.g., the most recent DCI that triggers the QCL-containing reference signal) that was successfully received at the UE (e.g., an indication of the reception time of the last successful DCI). In another example, the transmission configuration indicated by the QCL information that is exchanged either at 504 of FIG. 5 or 602 of FIG. 6 may include a combination of TCI state assumptions and the above-noted message reference.

Figure 7:
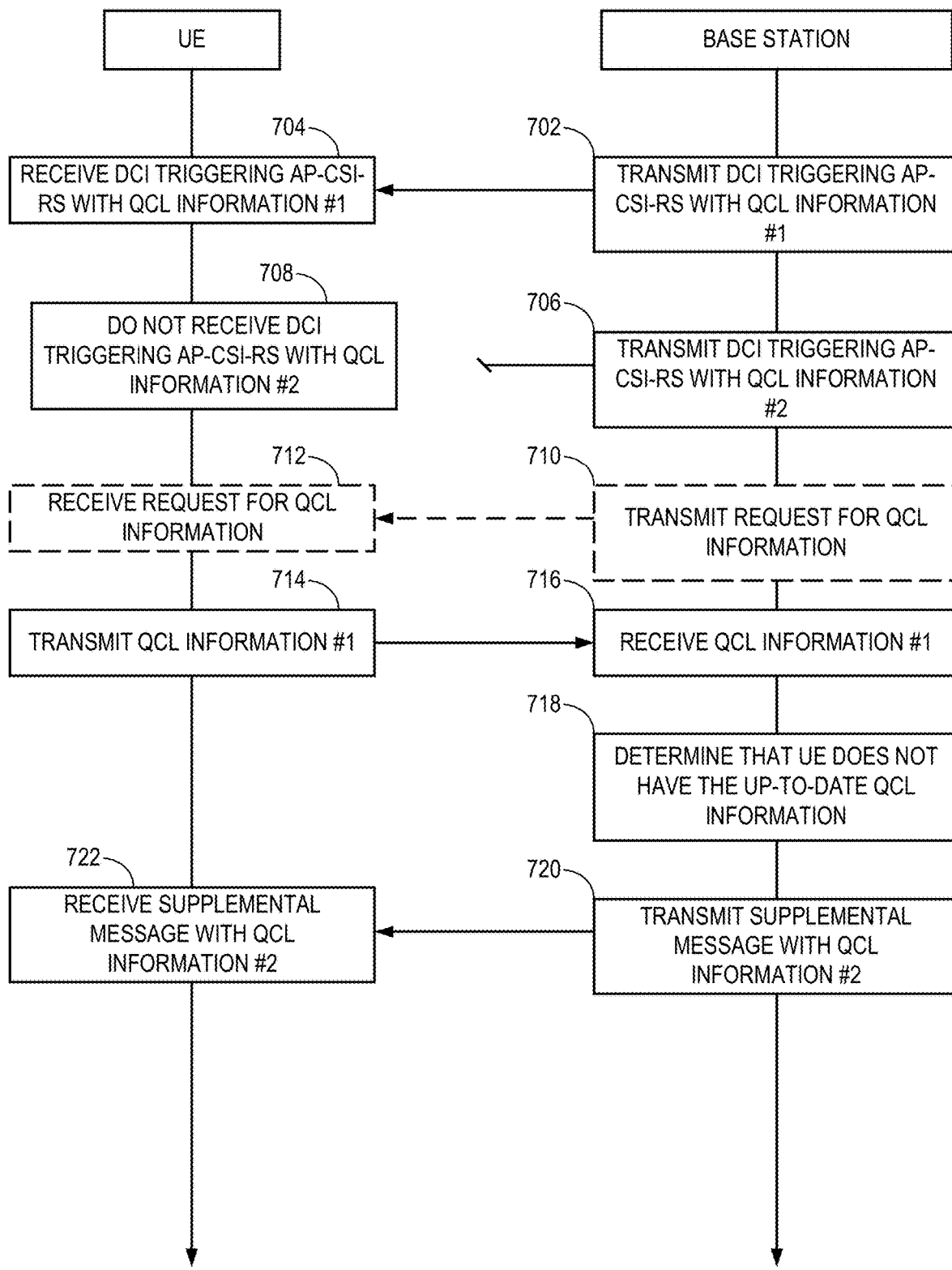
FIG. 7 illustrates an example implementation of the processes of FIGS. 5-6 in accordance with an aspect of the disclosure.

FIG. 7 illustrates an example implementation of the processes 500 and 600 of FIGS. 5-6 in accordance with an aspect of the disclosure. In particular, FIG. 7 illustrates an implementation whereby the QCL source corresponds to the AP-CSI-RS.

Referring to FIG. 7, at 702, a base station transmits a DCI triggering an AP-CSI-RS with QCL information #1 to the UE, which is received by the UE at 704 (e.g., as in 502 of FIG. 5). At 706, the base station attempts to transmit a DCI triggering an AP-CSI-RS with QCL information #2 to the UE, and at 708, the UE fails to successfully decode the DCK triggering the AP-CSI-RS with QCL information #2. At this point, the UE assumes that QCL information #1 is still up-to-date and does not realize the QCL mismatch, and the base station on the other hand assumes that the UE successfully decoded the DCI triggering the AP-CSI-RS with QCL information #2.

At 710, the base station optionally transmits, to the UE, a request for QCL information as determined at the UE, and, at 712, the UE optionally receives the request. In an example, 710-712 are optional because as noted above, the UE may send its QCL information to the base station on its own initiative (i.e., without such a request) in certain embodiments.

At 714 (e.g., as in 504 of FIG. 5), the UE transmits QCL information #1 (e.g., the actual TCI state assumptions and/or a reference to the DCI that was successfully decoded at 704) to the base station, which receives the UE's transmission at 716 (e.g., as in 602 of FIG. 6). At 718, the base station detects the QCL information mismatch between the up-to-date QCL information #2 and the out-of-date QCL information #1 that was reported by the UE. At 720, the base station transmits a supplemental message with QCL information #2, and at 722, the UE receives the supplemental message. At this point, the QCL information mismatch between the UE and the base station is resolved.

While the processes of FIGS. 5-7 generally relate to solving the QCL information mismatch problem by having the UE reports its QCL information assumptions to the base station, other embodiments are more specifically directed to the QCL information mismatch problem as it may arise due to certain DCIs being exempted from the requirement for the UE to provide any acknowledgment.

Figure 8:
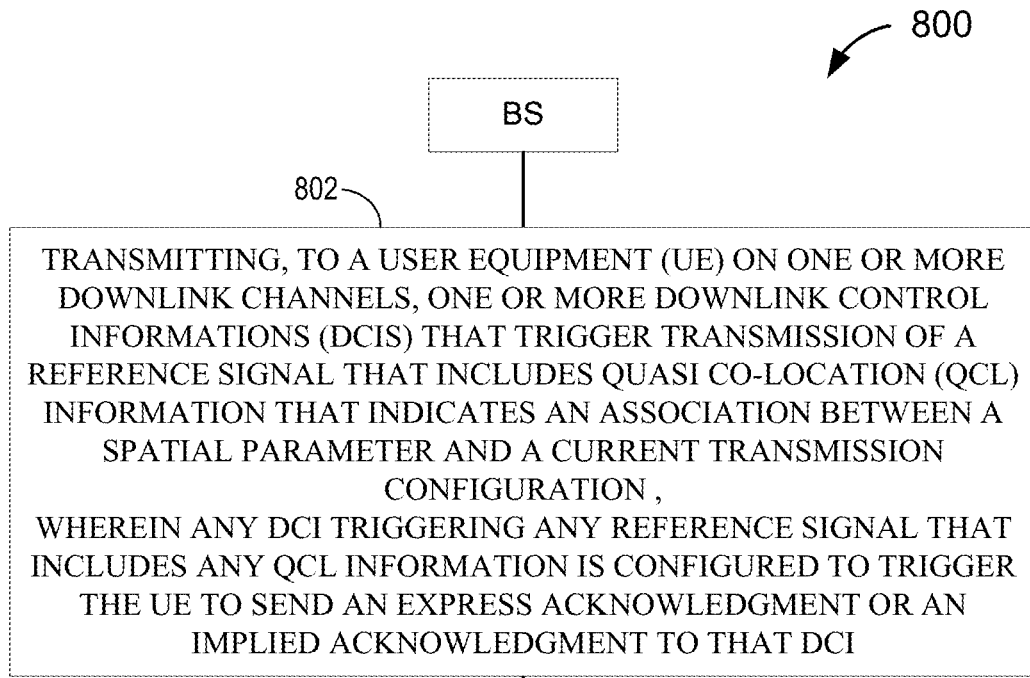
FIG. 8 illustrates an exemplary process of transmitting DCIs from a base station to a UE according to another aspect of the disclosure.

FIG. 8 illustrates an exemplary process 800 of transmitting DCIs from a base station to a UE according to another aspect of the disclosure. The process 800 of FIG. 8 is performed by a base station, such as a serving eNB (e.g., eNB 222, 224, 310, etc.). At 802, the base station (e.g., antenna(s) 320, transmitter(s) 318, and/or TX processor 368) transmits, to a UE on one or more downlink channels, one or more DCIs that trigger transmission of a reference signal that includes QCL information that indicates an association between a spatial parameter (e.g., a spatial domain receive filter for downlink communications or a spatial domain transmit filter for uplink communications) and a current transmission configuration (e.g., one or more Transmission Configuration Information (TCI) state assumptions, a reference to the most recent message associated with the QCL information that was successfully received at the UE, etc.). In the embodiment of FIG. 8, any CSI-RS transmitted by the BS to the UE that includes any DCI triggering any reference signal that includes any QCL information is configured to trigger the UE to send an express acknowledgment or an implied acknowledgment to that DCI.

Figure 9:
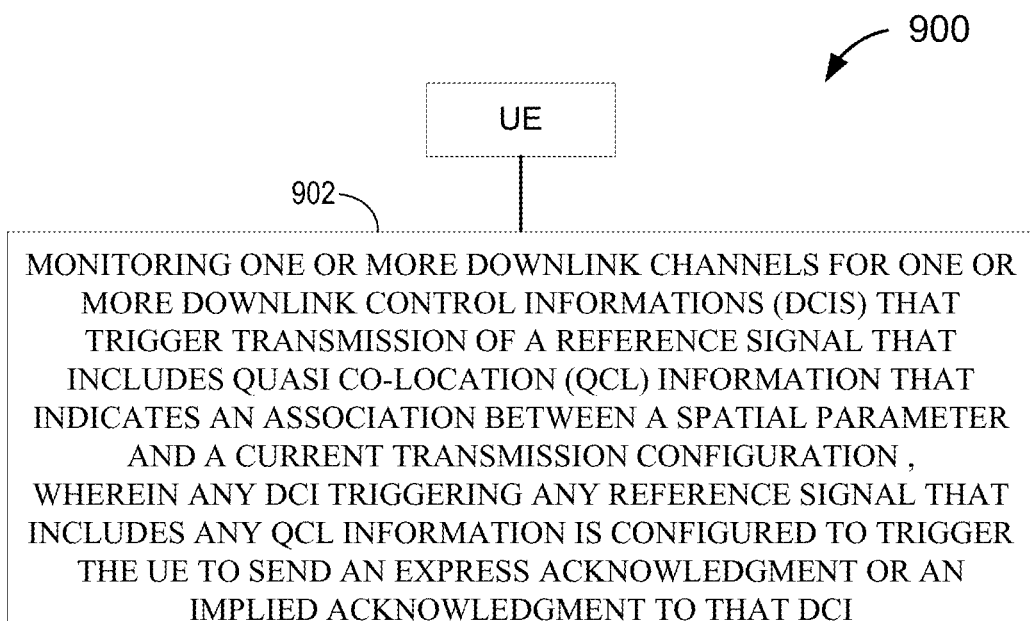
FIG. 9 illustrates an exemplary process of receiving DCIs according to another aspect of the disclosure.

FIG. 9 illustrates an exemplary process 900 of receiving DCIs according to another aspect of the disclosure. The process 900 of FIG. 9 is performed by a UE, which may correspond to any of the above-noted UEs (e.g., UE 240, 350, etc.). At 902, the UE (e.g., antenna(s) 352, receiver(s) 354, and/or RX processor 356) monitoring one or more downlink channels for one or more DCIs from a base station (BS) that trigger transmission of a reference signal that includes QCL information that indicates an association between a spatial parameter (e.g., a spatial domain receive filter for downlink communications or a spatial domain transmit filter for uplink communications) and a current transmission configuration (e.g., one or more Transmission Configuration Information (TCI) state assumptions, a reference to the most recent message associated with the QCL information that was successfully received at the UE, etc.). In the embodiment of FIG. 9, any DCI triggering any reference signal that includes any QCL information is configured to trigger the UE to send an express acknowledgment or an implied acknowledgment to that DCI.

Referring to FIGS. 8-9, in one example, the QCL information is associated with one or more reference signals, which may include a data channel reference signal (e.g., PDSCH DMRS, PUSCH DMRS, etc.) or a control channel reference signal (e.g., PUCCH DMRS, PDCCH DMRS, etc.). In another example, the one or more reference signals may include a reference signal generic to channel type (e.g., CSI-RS such as AP-CSI-RS, SRS, a Timing Reference Signal (TRS), etc.). In other examples, the one or more reference signals may include a first reference signal corresponding to a data channel reference signal or a control channel reference signal, and a second reference signal that is generic to a channel type.

Referring to FIGS. 8-9, in one example, the reference signal triggered by the DCI(s) may correspond to a CSI-RS, such as an AP-CSI-RS. In an example, the DCIs may be acknowledged by the UE via an express acknowledgment (or positive ACK). In another example, the DRS may be implicitly acknowledged. For example, the UE may simply start to operate in accordance with information from the most recent DCI, which may indirectly convey to the base station that this DCI was successfully received at the UE.

Referring to FIGS. 8-9, when the base station determines that the UE has failed to acknowledge a particular DCI (particularly, a DCI that triggers a reference signal containing QCL information), the base station may transmit a supplemental message to the UE that indicates the QCL information contained in a particular reference signal triggered by the particular DCI in response to the ACK-failure determination. The UE may receive the supplemental information, which then resolves the QCL information mismatch.

Figure 10:
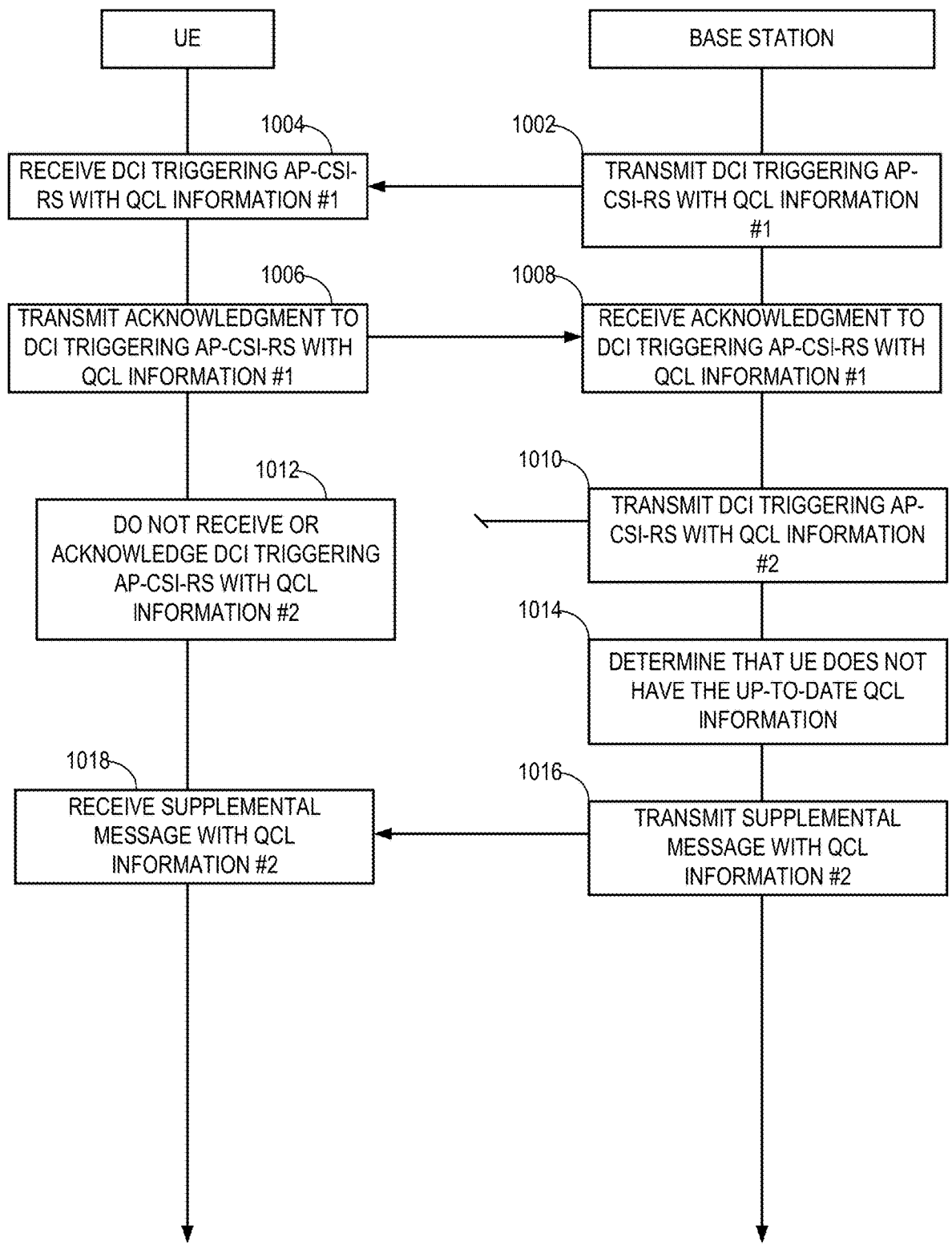
FIG. 10 illustrates an example implementation of the processes 800 and 900 of FIGS. 8-9 in accordance with an aspect of the disclosure.

FIG. 10 illustrates an example implementation of the processes 800 and 900 of FIGS. 8-9 in accordance with an aspect of the disclosure. In particular, FIG. 10 illustrates an implementation whereby the QCL source corresponds to the AP-CSI-RS, and the UE acknowledges the AP-CSI-RS via express acknowledgments.

Referring to FIG. 10, at 1002 (e.g., as in 802 of FIG. 8), a base station transmits a DCI triggering an AP-CSI-RS with QCL information #1 to the UE, which is received by the UE at 1004 (e.g., as in 902 of FIG. 9). As noted above, in the embodiment of FIG. 10, it is assumed that the any DCI containing QCL information is configured to trigger an express acknowledgment from the UE. Hence, at 1006, the UE transmits an acknowledgment to the DCI triggering the AP-CSI-RS with QCL information #1 to the base station, and the base station receives the acknowledgment at 1008.

Referring to FIG. 10, at 1010 (e.g., as in 802 of FIG. 8), the base station attempts to transmit a DCI triggering AP-CSI-RS with QCL information #2 to the UE, and at 1012 (e.g., as in 902 of FIG. 9), the UE fails to successfully decode the DCI triggering AP-CSI-RS with QCL information #2. At this point, the UE assumes that QCL information #1 is still up-to-date and does not realize the QCL mismatch. However, instead of assuming that the DCI was successfully received at the UE, the base station waits a threshold period of time for the UE to ACK the DCI triggering the AP-CSI-RS with QCL information #2. When this threshold of time elapses without any ACK from the UE, at 1014, the base station detects the QCL information mismatch between the up-to-date QCL information #2 and the out-of-date QCL information #1 that the base station assumes is still being used at the UE due to the UE's failure to ACK the DCI triggering the AP-CSI-RS with QCL information #2. At 1016, the base station transmits a supplemental message with QCL information #2, and at 1018, the UE receives the supplemental message. At this point, the QCL information mismatch between the UE and the base station is resolved.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
   decoding a first downlink control information (DCI) that triggers a first reference signal operation associated with first Quasi Co-Location (QCL) information, wherein the first QCL information indicates an association between a spatial parameter and a current transmission configuration;
   attempting to decode a second DCI that triggers a second reference signal operation associated with second QCL information; and
   transmitting, to a base station (BS), the first QCL information if the attempt is unsuccessful or the second QCL information if the attempt is successful.

2. The method of claim 1, wherein the spatial parameter is a spatial domain receive filter for downlink communications or a spatial domain transmit filter for uplink communications.

3. The method of claim 1, wherein the transmitted QCL information comprises one or more Transmission Configuration Information (TCI) state assumptions.

4. The method of claim 1, wherein the transmitted QCL information comprises a reference to the most recent message associated with the first or second QCL information that was successfully received at the UE.

5. The method of claim 1, wherein the transmitted QCL information is associated with one or more reference signals.

6. The method of claim 5, wherein the one or more reference signals include a data channel reference signal or a control channel reference signal.

7. The method of claim 5, wherein one of the reference signals is generic to a channel type.

8. The method of claim 5,
   wherein a first of the reference signals includes a data channel reference signal or a control channel reference signal, and
   wherein a second of the reference signals is generic to a channel type.

9. The method of claim 8, wherein the second reference signal is a Channel State Information (CSI) Reference Signal (RS).

10. The method of claim 1, further comprising:
    receiving, from the BS, a request for the UE to report current QCL information as determined at the UE, wherein the transmitting is performed in response to the request.

11. The method of claim 1, wherein the transmitting is performed without an express request from the BS for the UE to report current QCL information as determined at the UE.

12. The method of claim 1, further comprising:
    receiving, from the BS in response to the transmitting, updated QCL information if the transmitted QCL information is not up-to-date.

13. The method of claim 1, wherein updated QCL information is not received from the BS if the transmitted QCL information is up-to-date.

14. A method of operating a base station (BS), comprising:
    transmitting a first downlink control information (DCI) that triggers a first reference signal operation associated with first Quasi Co-Location (QCL) information, wherein the first QCL information indicates an association between a spatial parameter and a current transmission configuration;
    transmitting a second DCI that triggers a second reference signal operation associated with second QCL information; and
    receiving, from a user equipment (UE), the first QCL information if an attempt by the UE to decode the second DCI is unsuccessful or the second QCL information if the attempt by the UE to decode the second DCI is successful.

15. The method of claim 14, wherein the spatial parameter is a spatial domain receive filter for downlink communications or a spatial domain transmit filter for uplink communications.

16. The method of claim 14, wherein the received QCL information comprises one or more Transmission Configuration Information (TCI) state assumptions.

17. The method of claim 14, wherein the received QCL information comprises a reference to the most recent message associated with the first or second QCL information that was successfully received at the UE.

18. The method of claim 14, wherein the received QCL information is associated with one or more reference signals.

19. The method of claim 18, wherein one of the reference signals includes a data channel reference signal or a control channel reference signal.

20. The method of claim 18, wherein one of the reference signals is generic to a channel type.

21. The method of claim 18,
    wherein a first of the reference signals includes a data channel reference signal or a control channel reference signal, and
    wherein a second of the reference signals is generic to a channel type.

22. The method of claim 18, wherein the second reference signal is a Channel State Information (CSI) Reference Signal (RS).

23. The method of claim 14, further comprising:
    determining whether the received QCL information received from the UE is up-to-date; and
    selectively transmitting up-to-date QCL information to the UE based on the determining.

24. The method of claim 14, further comprising:
    transmitting, to the UE, a request for the UE to report current QCL information as determined at the UE, wherein the receiving occurs in response to the request.

25. The method of claim 14, wherein the receiving occurs without an express request from the BS for the UE to report current QCL information as determined at the UE.

26. The method of claim 14, wherein the received QCL information includes:
Transmission Configuration Information (TCI) state assumptions, or
a reference to the most recent message associated with the first or second QCL information that was successfully received at the UE, or
a combination thereof.

27. A user equipment (UE), comprising:
means for decoding a first downlink control information (DCI) that triggers a first reference signal operation associated with first Quasi Co-Location (QCL) information, wherein the first QCL information indicates an association between a spatial parameter and a current transmission configuration;
means for attempting to decode a second DCI that triggers a second reference signal operation associated with second QCL information; and
and
means for transmitting, to a base station (BS), the first QCL information if the attempt is unsuccessful or the second QCL information if the attempt is successful.

28. The UE of claim 27, wherein the spatial parameter is a spatial domain receive filter for downlink communications or a spatial domain transmit filter for uplink communications.

29. The UE of claim 27, wherein the transmitted QCL information comprises one or more Transmission Configuration Information (TCI) state assumptions.

30. The UE of claim 27, wherein the transmitted QCL information comprises a reference to the most recent message associated with the first or second QCL information that was successfully received at the UE.

31. A base station (BS), comprising:
a memory;
at least one processor; and
means for transmitting a first downlink control information (DCI) that triggers a first reference signal operation associated with first Quasi Co-Location (QCL) information, wherein the first QCL information indicates an association between a spatial parameter and a current transmission configuration;
means for transmitting a second DCI that triggers a second reference signal operation associated with second QCL information; and
means for receiving, from a user equipment (UE), the first QCL information if an attempt by the UE to decode the second DCI is unsuccessful or the second QCL information if the attempt by the UE to decode the second DCI is successful.

32. The BS of claim 31, wherein the spatial parameter is a spatial domain receive filter for downlink communications or a spatial domain transmit filter for uplink communications.

33. The BS of claim 31, wherein the received QCL information comprises one or more Transmission Configuration Information (TCI) state assumptions.

34. The BS of claim 31, wherein the received QCL information comprises a reference to the most recent message associated with the first or second QCL information that was successfully received at the UE.

35. A user equipment (UE), comprising:
a memory; and
at least one processor coupled to the memory and configured to:
decode a first downlink control information (DCI) that triggers a first reference signal operation associated with first Quasi Co-Location (QCL) information, wherein the first QCL information indicates an association between a spatial parameter and a current transmission configuration;
attempt to decode a second DCI that triggers a second reference signal operation associated with second QCL information; and
transmit, to a base station (BS), the first QCL information if the attempt is unsuccessful or the second QCL information if the attempt is successful.

36. The UE of claim 35, wherein the spatial parameter is a spatial domain receive filter for downlink communications or a spatial domain transmit filter for uplink communications.

37. The UE of claim 35, wherein the transmitted QCL information comprises one or more Transmission Configuration Information (TCI) state assumptions.

38. The UE of claim 35, wherein the transmitted QCL information comprises a reference to the most recent message associated with the first or second QCL information that was successfully received at the UE.

39. A base station (BS), comprising:
a memory; and
at least one processor coupled to the memory and configured to:
transmit a first downlink control information (DCI) that triggers a first reference signal operation associated with first Quasi Co-Location (QCL) information, wherein the first QCL information indicates an association between a spatial parameter and a current transmission configuration;
transmit a second DCI that triggers a second reference signal operation associated with second QCL information; and
receive, from a user equipment (UE), the first QCL information if an attempt by the UE to decode the second DCI is unsuccessful or the second QCL information if the attempt by the UE to decode the second DCI is successful.

40. The BS of claim 39, wherein the spatial parameter is a spatial domain receive filter for downlink communications or a spatial domain transmit filter for uplink communications.

41. The BS of claim 39, wherein the received QCL information comprises one or more Transmission Configuration Information (TCI) state assumptions.

42. The BS of claim 39, wherein the received QCL information comprises a reference to the most recent message associated with the first or second QCL information that was successfully received at the UE.

43. A non-transitory computer-readable medium containing instructions stored thereon, which, when executed by a user equipment (UE), cause the UE to perform operations, the instructions comprising:
at least one instruction to cause the UE to decode a first downlink control information (DCI) that triggers a first reference signal operation associated with first Quasi Co-Location (QCL) information, wherein the first QCL information indicates an association between a spatial parameter and a current transmission configuration;
at least one instruction to cause the UE to attempt to decode a second DCI that triggers a second reference signal operation associated with second QCL information; and
at least one instruction to cause the UE to transmit, to a base station (BS), the first QCL information if the attempt is unsuccessful or the second QCL information if the attempt is successful.

44. A non-transitory computer-readable medium containing instructions stored thereon, which, when executed by a base station (BS), cause the BS to perform operations, the instructions comprising:
- at least one instruction to cause the BS to transmit a first downlink control information (DCI) that triggers a first reference signal operation associated with first Quasi Co-Location (QCL) information, wherein the first QCL information indicates an association between a spatial parameter and a current transmission configuration;
- at least one instruction to cause the BS to transmit a second DCI that triggers a second reference signal operation associated with second QCL information; and
- at least one instruction to cause the BS to receive, from a user equipment (UE), the first QCL information if an attempt by the UE to decode the second DCI is unsuccessful or the second QCL information if the attempt by the UE to decode the second DCI is successful.

* * * * *